United States Patent [19]

Hassler, Jr.

[11] Patent Number: 5,258,931
[45] Date of Patent: Nov. 2, 1993

[54] PRECISION ELECTRONIC ABSOLUTE AND RELATIVE POSITION SENSING DEVICE AND METHOD OF USING SAME

[75] Inventor: William L. Hassler, Jr., El Toro, Calif.

[73] Assignee: Parker-Hannifin Corporation, Cleveland, Ohio

[21] Appl. No.: 741,219

[22] Filed: Aug. 2, 1991

Related U.S. Application Data

[63] Continuation of Ser. No. 652,316, Feb. 6, 1991, abandoned, which is a continuation of Ser. No. 217,015, Jul. 8, 1988, abandoned.

[51] Int. Cl.$^5$ .......................... G01B 3/02; G01J 11/00
[52] U.S. Cl. .................. 364/571.07; 364/561; 250/252.1; 33/701; 33/707; 341/13; 356/401; 377/17
[58] Field of Search .......... 364/559, 560, 561, 562, 364/571.01, 571.03, 571.04, 571.07; 250/252.1, 237 G; 377/17, 18; 356/375, 383, 387, 399, 401; 341/13; 33/700, 701, 702, 706, 707, DIG. 3, DIG. 4

[56] References Cited

U.S. PATENT DOCUMENTS

| | | | |
|---|---|---|---|
| 3,648,276 | 3/1972 | Schuman | 341/2 |
| 4,074,258 | 2/1978 | Dore' et al. | 340/347 P |
| 4,114,035 | 7/1978 | Herzog | 250/214 PR |
| 4,181,961 | 1/1980 | Nopper | 364/571.07 |
| 4,321,830 | 3/1982 | Horn | 364/559 |
| 4,413,186 | 11/1983 | Uema | 364/559 |
| 4,435,835 | 3/1984 | Sakow et al. | 364/559 |
| 4,471,447 | 9/1984 | Williams et al. | 364/559 |
| 4,727,423 | 9/1988 | Kaneko et al. | 358/160 |
| 4,779,211 | 10/1988 | March | 364/560 |

FOREIGN PATENT DOCUMENTS 58-150804 7/1983 Japan .

*Primary Examiner*—Jack B. Harvey
*Assistant Examiner*—Edward Pipala
*Attorney, Agent, or Firm*—Christopher H. Morgan

[57] ABSTRACT

A novel position sensing device and novel method for determining position use an electronic memory to retain a look up table for calibrated position indicia on a scale. The position indicia are preferably arranged along the scale so that at least two indicia are positioned at unique distances apart in each length segment of the scale. A reader electrically reads the at least two indicia of a segment and the electronic memory look up table allows the at least two indicia to determine the segment, position within segment, and the position relationship between the position within the segment and the reader. Preferably, the indicia are slits in a scale bar, and the reader is a light source and charge-coupled device. The position of the slits is preferably determined using more than one pixel of the charge-coupled device.

28 Claims, 5 Drawing Sheets

PRECISION ELECTRONIC ABSOLUTE AND RELATIVE POSITION SENSING DEVICE AND METHOD OF USING SAME

This is a continuation of copending application Ser. No. 07/652,316 filed on Feb. 6, 1991, which is a continuation of application Ser. No. 07/217,015 filed on Jul. 8, 1988 and amended on Oct. 5, 1990, both now abandoned.

BACKGROUND OF THE INVENTION

1. Field of the Invention

This invention relates in general to electronic relative position sensing devices or devices which indicate the relative position of two elements, one moveable with respect to the other. More particularly, but without limitation, this invention relates to such devices having machine readable indicia on a scale fixed to one of the elements. Further, this invention relates to methods of using relative position sensing devices and reading the indicia thereon.

2. Description of the Prior Art

In many areas of industry and manufacturing, it is important to accurately position one element or device with respect to another. For example, in machining on a lathe with a movable table, it is important that the table carrying the tool bit be accurately positioned with respect to the bed holding the chuck and the work piece. To allow this positioning to be performed, a position sensor can be used. In addition to accurate relative positioning, it is also often necessary to move the table and tool bit to and from or between very accurate relative positions with respect to the bed.

For example, it might be desired to perform a first machining operation on the work piece with the tool bit at one relative position and then automatically move the tool bit (by moving the table on the bed) to a second position and perform a second machining operation on the work piece. Many times it is desired to have great accuracy in the machined work resulting from the first and second position machining operations. A position sensor connected to the table drive can be used for automatic performance of such multiple stops. Still further, it is often desirable to change the positions at which stops or operations are performed, and this requires that new position locations be established with accuracy. An electronic position sensor can allow the machine to be electronically reset to new stops.

Of course, it is desirable to provide simpler and less expensive methods and devices for performing these sensing operations more quickly and more accurately. This is especially true in fields such as integrated circuit manufacture where extremely accurate positioning is required.

Among the devices which desirably use such relative position sensing methods and devices are lathes, milling machines, microscopes, telescopes, industrial robots, cylinders, flight controls, drill presses, production automation equipment, etc.

Among the devices currently available for relative position sensing are electronic relative position sensors which have scales provided on them and means for electrically reading these scales. The scale can be attached to the moveable table carrying the tool bit or the like, and the electrical reader of the scale can be connected to the lathe bed or the like, or vice versa. As the device moves, the reader electrically senses or determines the relative position between the scale and reader and, thereby, the relative position between the tool bit table and lathe bed and the devices to which they are attached.

In general, electronic relative position sensing devices fall into two major categories. The first category is best characterized as a serial device or counter. These devices are only capable of determining the distance between two stops by counting or otherwise electrically measuring the distance between the two stops. Because the counter has no means of sensing where on the scale it is because it can only measure by counting, this device measures only relative positions. The second kind of device is best characterized as an absolute position sensing device. In these devices, where on the scale ——an absolute position—— is able to be determined and this allows relative positions to also be determined. In other words, a position on the scale, such as 3 inches from the zero point of the scale, is readable directly from absolute position indicia on the scale at that point.

Prior to this invention, the serial devices or counters have been most successful because of greater accuracy and lower cost. Among these devices are rotary counters which have a wheel, gear or screw which turns as a result of the motion and an electronic counter which counts rotations or parts of rotations of the wheel or screw. Similarly, there are devices which have magnetic marks or slits or other indicia on a bar and provide an electronic means for counting the passage of each one of these indicia. Of course, in both of these devices, the accuracy of the location of the machine-read indicia on the scale determines the accuracy of the device. Thus, the best accuracy of these devices is approximately 20 microinches (0.00002 inches).

A good example of the most accurate of the serial or incremental position sensing devices are Heidenhain electronic measuring scales made by Heidenhain Corporation. These devices have glass scales with extremely accurate etched markings positioned thereon which can be electronically counted by a movable reader. To accurately etch the markings requires a laboratory secured deep underground with local trains prevented from running to avoid distant earth vibrations. Isolation tables, unique machine tools and unique measuring equipment are required to perform the etched marking. Of course, the scales produced in this way so as to provide 20 microinch accuracy are very expensive.

Position sensing rotary devices, like linear counters, count increments to determine position. Rotary devices, however, count turns or portions of turns of a position wheel. A problem with these devices is that they lose accuracy if there is any slippage between the position wheel and the device causing the rotation and gears do not move entirely smoothly as they rotate. Both the linear and the rotary counters are unable to determine where on the scale the device is if the power is turned off or is otherwise interrupted so that it loses its place.

Absolute position devices avoid the problem of losing their place by having place determining markings thereon. A good example of such a device is shown in U.S. Pat. No. 4,074,258 to Dore, et al. This device includes a graduated scale which carries marks which are transparent on an opaque background or opaque on a transparent background so the marks can be interpreted by a photo-electric reader. A first set of identical marks are distributed at equal intervals along the scale, for example, at one inch intervals. These marks are precisely located because the location of each mark is used as a reference for interpolation. In this regard, the scale is like a serial positioning device.

However, adjacent the accurately positioned and spaced interpolation marks are a group of identifying marks (typically a binary number representation) which can be electrically determined as uniquely identifying the adjacent precisely located interpolation mark. The interpolation marks are distinguished from the identification marks by the intensity of light, by the width of the marks or by other means. In this way the electrical interpretation of the identifying marks can be made allowing the particular location of the interpolation mark to be identified. Then a characteristic such as the leading edge of the interpolation mark is used to provide a relative distance along the reader.

In one embodiment, the Dore et al. patent describes distinguishing between interpolation marks and identifying marks by the width of the marks as read by light on a charge-coupled device. An interpolation mark is five pixels wide and an identifying mark is 10 pixels wide. Specifically, a first pixel of a five pixel interpolation mark, identified by the binary code of 10 pixel identifying marks adjacent thereto, is read from the pixels of a charge-coupled device reader as the relative position of the CCD reader with respect to the scale.

Of course, a problem with this device is that the identifying marks cause the position or interpolation marks to be farther apart. This means the accuracy of the device is reduced because less magnification (the means by which the marks are more finely interpreted) is possible.

Other similar absolute position devices utilize marks of identification located transversely to the interpolation marks or position marks. The difference in position allows these marks to be separately read so as to distinguish them without differences in width or intensity. With these devices, however, a separate reader or readers is required for the identifying marks.

In general, absolute and relative devices suffer by not being sufficiently accurate. Like relative devices, the precision of an absolute device depends upon the precision with which the interpolation or position marks are placed on a scale. Very accurate painting, grinding, cutting or etching is required and the limits of this marking sets the limit for the accuracy of the device. Of course, the most accurate of these devices are very expensive because of the extreme manufacturing techniques required.

Another problem with the absolute positioning devices is that the means for reading the identifying marks are complicated, slow, and inaccurate. Thus, an electronic means must be provided to distinguish the interpolation marks from the identifying marks, the identifying marks must then be converted to a form which can be read and then the binary number or the like must be associated with the proper interpolation or positioning mark.

The position of the identifying mark is made using only a single characteristic of the mark such as the leading edge (first pixel of five pixel mark, for example). This leading edge is identified by the pixel of a CCD having an output signal of a predetermined strength. Variations in light source strength, electronic noise, dirt on the magnifying lens, and many other disturbing factors can prevent proper interpretation of the identifying mark position characteristic from being read or from being read accurately.

Another problem with all of these devices is that the precision of the device can be reduced or destroyed by a mounting which stresses or moves the marks with respect to each other. Still further, thermal changes cause the marks to move with respect to each other also changing the accuracy of the scale. Usually, however, the scale is not sufficiently accurate to be affected by thermal expansion. Even further, the devices for shining light through lenses or the like have not been satisfactory enough to provide accurate reading.

SUMMARY OF THE INVENTION

It is accordingly an object of the present invention to provide an improved relative position sensing device and method which are more accurate in measuring. Another object of this invention is to provide such a device and method which have simple construction and do not require extremely accurate positioning of indicia on a scale while still producing extremely accurate measurements.

Another object of the present invention is to provide a method of positioning and a positioning device which use simple and reliable electronics and which allow absolute relative positioning (do not lose position on scale). Yet another object is to provide such a method and device which can produce precision measurement even if the scale is distorted by impact or by thermal expansion or the like.

Yet another object of the present invention is to provide an improved method and device for reading indicia on a scale so that a more accurate determination and interpolation can be achieved. Still yet further, it is an object of the present invention to provide an improved means for interpreting the indicia on a scale for faster and more accurate reading of an absolute relative position.

In accordance with these objects, the present invention comprises a precision electronic relative position sensing device with a scale disposed along a position line. This scale has machine readable indicia fixed thereon disposed along the position line. A machine reading means moveable with respect to the scale along the position line is provided for reading and converting the indicia to electrical signals. A memory means is provided for retaining and electrically communicating for each indicia an indication of the relative position of the indicia along the position line. A position determining means is provided for receiving the electrical signals from the reading means and interpreting those signals using the memory means so as to determine therefrom the relative position along the position line of the reading means with respect to the scale.

The memory means of the present invention allows the location of each of the indicia to be set by calibration either before or after the installation of the device. The accuracy of the device, therefore, is determined by the accuracy of the calibration recorded in the memory means as opposed to the accuracy of the placement of the indicia on the scale.

Thus, a method of the present invention comprises calibrating a scale with position indicia thereon by recording in an electronic memory the determined positions of the indicia as indicated by a position calibration machine such as a laser interferometer. The recording in electronic memory creates a look up table of calibrated positions with respect to the scale for each of the position indicia. A reading device reads the indicia and the look up table is used to determine the calibrated position of the machine reader with respect to the scale.

To provide an absolute relative position sensing to be easily determined utilizing the indicia, the position line can be defined by a set of position segments. At least two indicia are disposed in each of the segments and the arrangement of the indicia is such that the position relationship between the at least two indicia in each segment is unique to define the segment. The combination of the line positions of the at least two indicia define a precise position along the position line within a segment. For example, if the indicia are slits in a bar scale read by a light source and charge-coupled device, two slits can be placed in every inch along the scale with the distance between the slits being unique for each inch. Thus, the distance between the slits defines in which inch along the scale these slits are located. Then, for each pair of slits the combination of the position of these two slits can be used to define a precise position within the inch by means of calibration. By this means, the indicia do not have to be distinguishable from each other and more information can be provided for both calibration position (where in segment) and absolute position (uniqueness of segment) definition.

The calibration position represented by the combination of the slit positions and the unique segment position indicated by the difference of the positions can be stored in a memory such as a read only memory. This read only memory can preferably be reprogrammed to recalibrate the absolute relative positioning device following any distortion that might occur during mounting.

A method of determining absolute position is thus provided by forming the position indicia in the manner described and by calibrating the scale so as to record in electronic memory a look up table of the combination (where in segment) data and difference (which segment) data for each segment. By reading the two indicia of a segment and using the look up table an absolute position of the reader with respect to the scale can be determined.

Preferably, the reading device of the present invention comprises a charge-coupled device, and the indicia on the scale comprise slits in a metal bar or the like. Also, preferably, the device includes a light source which approximates a lambertian light source extending over a span at least wide enough to always be directing light through the at least two slits of each segment. The charge-coupled device preferably, also, spans this length.

The method of reading the indicia provided by this invention includes using a charged coupled device to read more than one characteristic of each indicia. Thus, instead of reading just one pixel (the first or the last, for example) the present invention reads the first and last. It is even more preferable and to use the mean position of the indicia's intensity distribution (or full aperture) as a maximum information-carrying indication of the position of the indicia.

Correction for thermal expansion can be provided by a temperature sensor which senses the temperature of the scale and a calculation for compensating for the thermal expansion of the scale based on this temperature.

For a further understanding of the invention and further objects, features and advantages thereof, reference may now be had to the following description taken in conjunction with the accompanying drawings.

DESCRIPTION OF PREFERRED EMBODIMENTS

Figure 1:
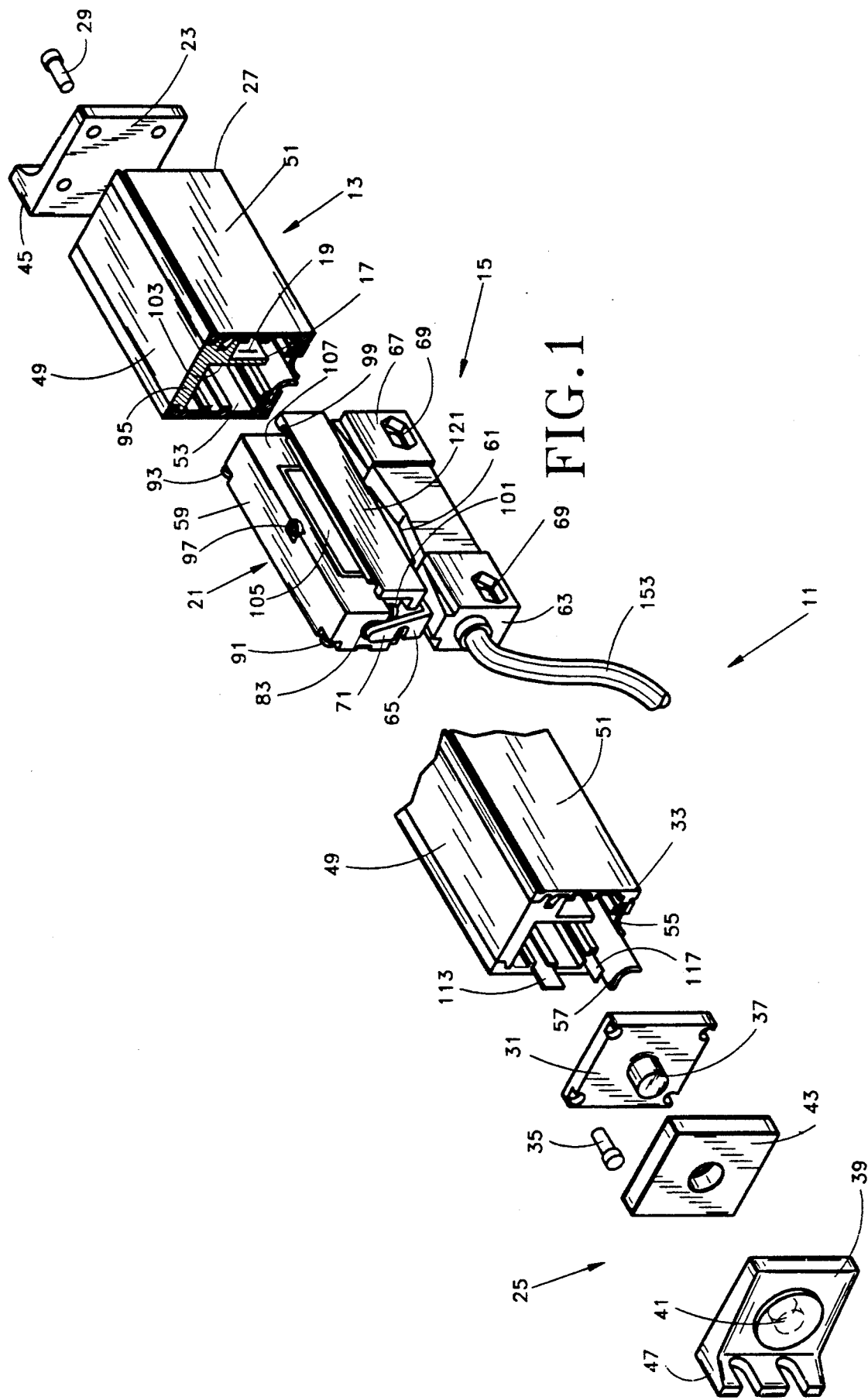
FIG. 1 is an exploded, cutaway perspective view of a device constructed in accordance with the present invention.
Figure 2:
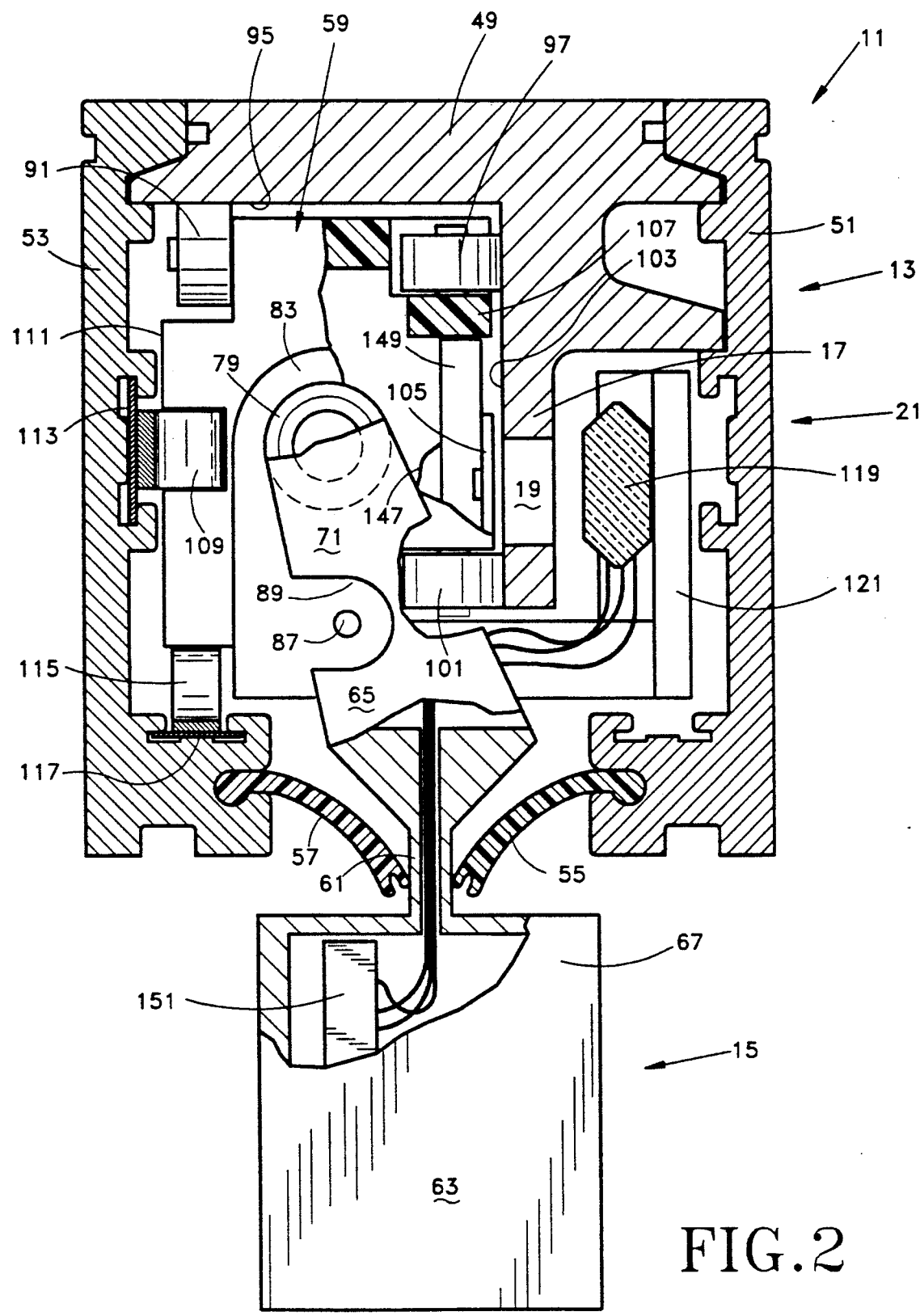
FIG. 2 is a sectional view of the device shown in FIG. 1 taken along the lines shown in FIG. 1.
Figure 4:
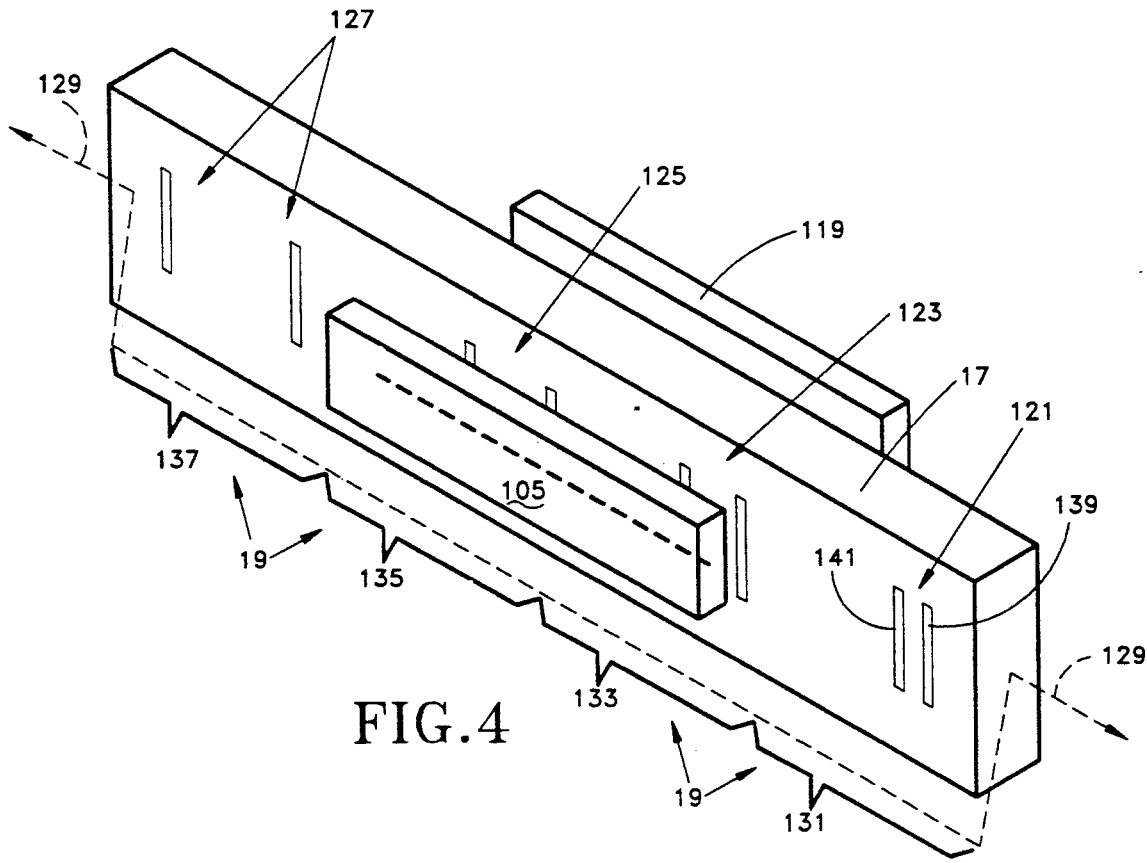
FIG. 4 is a schematic view of the basic elements of the device shown in FIG. 1.

Referring now to FIGS. 1, 2 and 4, the position device of the present invention is shown at 11. The device 11 includes a scale housing 13 and a traveler assembly 15. The scale housing 13 has a scale bar 17 with slits 19 therein which can be read by an electrical-optical reader 21 of the traveler assembly 15.

By fixing the scale housing 13 to one element or device and the traveler assembly 15 to a second element or device, the relative position between the two elements can be electrically read by the device 11 of the present invention. For example, the scale housing 13 can be attached to the movable table of a lathe and the traveler assembly 15 can be attached to bed of the lathe so that the relative position between the table and the bed can be electrically read. This would allow the bed to be accurately positioned with respect to a work piece mounted on the chuck fixed for rotation on the bed for accurate, automatic positioning and machining operations on the work piece.

To attach the scale housing 13 to an external element or device, end caps 23 and 25 are provided. End cap 23 is a single piece which is attached directly to the fixed or reference end 27 of the scale housing 13 by assembly screws 29. End cap 25 is comprised of three pieces (31, 39, 43) and functions as a floating end mount. A cap piece 31 is connected to the floating or non-reference end 33 of housing 13 by assembly screws 35. A cylindrical protruding nose 37 extends from the cap piece 31 to provide a floating connection to the mount piece 39. A recess 41 closely but freely receives the cylindrical nose 37. A compressible spacer 43 is resiliently captured between the cap piece 31 and the mount piece 39 with the nose 37 extending therethrough. The spacer 43 is an resilient, compressible, insulative material. A flange 45 is provided on end cap 23 with bolt holes therethrough to allow the end cap 23 to be bolted to an element such as a work table of a lathe. A flange 47 of mount piece 39 is provided with bolt holes so that it can be bolted to this same element. In this way, the scale housing 13 is joined to the element or device in a way which fixes the reference end against movement while allowing the non-reference end a relative freedom of movement. This relative freedom of movement is required so that the mounting process does not twist or distort the scale housing 13. Further, the method of mounting allows thermal expansion of the housing to occur without distortion of the housing. The compressible spacer 43 protects the housing against vibration and foreign object damage, shipping damage and mismounting.

The scale housing 13 is comprised of a scale extrusion 49, a right side housing extrusion 51, a left side housing extrusion 53 and seal lips 55 and 57. These pieces enclose and protect the rider portion 59 of the traveler assembly 15 against contamination and physical abuse. The rider portion 59 carries the electrical-optical reader 21 for the scale bar 17 which extends as an interior flange from the scale extrusion 49. Mating grooves and flanges are provided between the right and left side housing extrusions and scale extrusion 49 so that these pieces form a solid housing when connected to the cap piece 31 and the end cap 23. The extrusion pieces 49, 51 and 53 can all be formed from aluminum or the like.

The seal lips 55 and 53 are formed of a flexible material which is preferably chemically resistant such as teflon or fluorosilicone. The lips 55 and 57 have beads which are retained in a widened space in grooves in the left and right side housing pieces 51 and 53, respectively. The lips 55 and 57 extend toward each other to form a vee shape which is able to be opened by the neck 61 of the traveler head 63 of the traveler assembly 15.

The traveler head 63 is a single piece of molded material such as Ryton. This single piece includes a yoke 65 and a head piece 67 connected by the neck 61. Bolt holes 69 are provided in the head piece 67 so that the traveler head 63 can be connected to an external element by bolts extending through these bolt holes 69. In this way the traveler head can be connected to a device such as the bed of a lathe so that the relative position between the bed (attached to the traveler head 63) and the moveable table (attached to the scale housing 13) can be determined.

As seen best in FIGS. 1, 2, 6 and 7 the yoke 65 of the traveler head 63 has pair of arms 71, 73 which have semi-spherical bearing surfaces 75 and 77, thereon. These bearing surfaces each receive an interface cup 79 and 81 which functions as a floating interface between the end of the rider 59 which is moved by the traveler head 63 because of the yoke 65. The interface cups have a planar surface which is received on a mating planar surface inside a such as recess 83 provided in the end of the rider 59 (shown enlarged in FIG. 7).

The yoke arms 71 and 73 are slightly resiliently spread by the close fit of the rider 59 inside the interface cups 79 and 81. However, the amount by which the arms are spread and the pressure on the interface cups is not so much as to prevent the planar surfaces of the interface cups from relatively freely gliding on the planar surface of the recess. This pressure can be determined by a groove 85 which weakens and improves the flexibility of arm 71. In this way, the yoke 65 has a reference end at arm 73 and a non-reference end at arm 71, similar to the reference and non-reference end of the housing 13. The characteristics of the material and the size of the groove 85 can determine how stiffly the yoke 65 holds the rider 59.

The object of this connection between the yoke arm 71 and 73 and the rider 59 is to prevent non-linear movements of the traveler head 63 from causing similar non-linear movements of the rider 59. In other words, the rider 59 is desired to be retained in its position with respect to the scale bar 17 as it moves linearly with respect thereto. By providing a five degree of freedom connection between the rider 59 and traveler head 63, this object can be achieved.

To hold the yoke arms 71 and 73 from becoming disconnected entirely from the rider 59 prior to mounting the scale housing 13 and the traveler assembly 15 to the relative position elements which they track, pins 87 are received through retaining pin slots 89 in the yoke arms 71 and 73.

The purpose for the five degree of freedom movement of the yoke 65 and the traveler head 63 with respect to the rider 59 is so that the rider 59 is not urged out of its linear motion with respect to the scale bar 17. In other words it is critical that the linear motion of the rider 59 in its frame of reference (which includes the scale bar 17) not be disturbed by movements in the frame of reference of the traveler head 63 which are other than linear movements parallel to the linear motion of the rider 59 (parallel to an imaginary position line extending through the center of bar 17).

To further improve this restriction of the rider 59 to a linear motion, a unique bearing and spring system is provided. Contact bearings 91 and 93 are provided in the corners of the rider 59 to bear against a first planar reference surface 95 of the scale extrusion 49 adjacent the left housing extrusion 53. Contact bearings 97, 99 and 101 are disposed on the rider 59 so that they ride on a second planar reference surface 103 of the scale extrusion 49. The second reference surface 103 is formed in part by a surface of the scale bar 17. The second planar surface 103 is disposed at a right angle to the first planar surface 95. Bearings 97, 99 and 101 form a triangle, the center of which is approximately the center of the charge-coupled device 105.

The charge-coupled device 105 is positioned so that its face is close to and approximately parallel to the face 107 of rider 59 which rides adjacent the second planer reference surface 103. Thus, as the bearings 97, 99 and 101 ride on the second planar reference surface 103 the charge-coupled device 105 is held a fixed close distance spaced from the scale bar 17 and the slits 19 therein.

The body of rider 59 has a right rectangular parallelepiped shape with rectangular face 107 being a portion thereof. To provide a wide, steady support so as to retain the rider 59 in its linear motion in its frame of reference, bearings 91, 93, 99 and 101 are disposed at corners of the body. Bearings 91 and 93 are at upper corners of a surface 111 opposite face 107 and bearings 99 and 101 are at the lower corners of face 107. Bearing 97 is at the center of the upper edge of face 107.

Opposite the contact bearings 97, 99 and 101 is a leaf spring 109. The leaf spring 109 is attached to surface 111 of rider 59 so that it contacts near the center of this surface. It bears against a leaf spring wear shim 113 which is held in a mating groove on the left housing extrusion 53. In this way the leaf spring 109 urges the rider 59 so that approximately equal pressure is applied to bearings 97, 99 and 101. Further, the center contact helps prevent hysteresis as the rider 59 changes direction.

A leaf spring 115 is provided directly opposite bearings 91 and 93 on rider 59. It contacts a leaf spring wear shim 117 which extends in a mating groove in a lower flange of the left housing extrusion 53. The leaf spring 115 contacts the wear shim at approximately the center of the rider 59 opposite the bearings 91 and 93 so that it urges the rider 59 to press on the bearings 91 and 93 against the first reference surface 95 with approximately equal force.

By use of the five bearings 91, 93, 97, 99 and 101, at the diagonally opposite corners of the rider 59 (bearing 91 being diagonally opposite bearing 99 and bearing 93 being diagonally opposite bearing 101) and with bearing 97 being centered on the rectangular edge between the diagonally opposite bearings, the rider 59 is limited to only one degree of freedom in its movement as long as the springs 115 and 109 cause the bearings to be pressed against their reference surfaces with equal strength. This is achieved with a minimum number of bearings and springs. The minimum number is critically important to prevent rocking of the rider and hysteresis which would occur if more bearings were included but not precisely balanced.

The combination of the design of housing 13, rider 59 support in housing 13, and connection of the traveler 63 to the rider 59 produces a relative motion device which is especially precise and avoids disturbances to linear motion. It isolates the frame of reference of the rider and scale from the frame of reference of the traveler head except for the linear degree of freedom parallel to the bar 17 and its imaginary position line extending longitudinally therethrough. This importantly allows the reader 21 to track precisely for reading the slits 19 in scale bar 17.

The housing mounting prevents the scale from being distorted during the mounting process or due to other forces. Particularly, the floating end 33 of the housing 13 protects the traveling surfaces and the scale from distortions. The bearings which support the rider 59 prevent the reader 21 from moving out of a linear path along the bar 19. The connection of the traveler 63 with the rider 59 prevents the out of line motions of the traveler 63 from being transmitted to the rider 59. Thus, precise, repeatable linear motion of the reader 21 with respect to the bar 17 and slits 19 is provided.

The importance of the steady, smooth tracking of the rider 59 along the reference surfaces 95 and 103 in housing 13 becomes apparent with the understanding of the accuracy which the reader 21 provides. The reader 21 includes a charge-coupled device 105 and a light source 119. The light source 119 is mounted on an arm 121 of the rider 59 which extends around bar 17. The light source 119 is attached so that it faces the charge-coupled device 105 so as to shine light through the slots 19.

The charge-coupled device 105 is preferably a device like Texas Instruments part no. TC104. This device is approximately 2 inches long and has 3,456 pixels arranged along its length for electrically reading light received from the light source 119. Each pixel has both an on/off and a strength of light signal. The charge-coupled device has a dynamic range of approximately 1,000 to 1 and a read speed of faster than 0.5 milliseconds. The construction, operation, reading and powering of such charge-coupled devices is well known to those in the electrical art.

The light source 119 extends over a 2 inch length parallel to and directly in line with the charge-coupled device 105. Preferably, this light source 119 approximates a lambertian light source over this entire length. In other words, the light source 119 provides uniform, non-directional light along all of the length of the light source so that a slit 19 at any position between the light source 119 and the charge-coupled device 105 will be read uniformly. Electro luminescent panels are commercially available from Luminescence Systems, Inc. and Quantex, Inc. The operation, construction and powering of such panels are well known to those in the art of light sources. Further, an improved lambertian light source of a type particularly suited for use with the device of the present invention is described in my copending application filed of even date herewith and entitled Linear Diffuse Light Source.

The slits 19 in scale 17 are arranged in pairs along the bar 17. Pairs 121, 123, 125 and 127 are shown in bar 17 of FIG. 4. Each slit 19 extends transversely to an imaginary position line through an imaginary position line which extends through the center of bar 17. Each slit 19 also extends transversely through the bar 17. The slits 19 can be formed by laser cutting or by an electrodischarge machine. They do not require precise positioning. The bar 17, the arm 121 and the housing 13 allow only light from the light source 119 to be received by the charge-coupled device 105 through the slits 19.

Conceptually, the scale or distance along position line 129 can be divided into segments such as segments 131, 133, 135 and 137. These segments are continuous and do not overlap along the position line 129. Each segment has a single pair of slits disposed therein. Thus, pair 121 is located within segment 131, pair 123 is located within segment 133 and so on.

Each pair of slits defines and determines both the segment and a precise position within the segment. The distance between the slits of each pair is unique for each segment. A distance measurement between the slits 19 of pair 121 thus define that this pair of slits 121 resides in segment 131. The distance between the slits 19 of pair 123, because this distance measurement is different, defines that the pair of slits 123 reside in segment 133.

A precise position along the position line 129 can be determined by the combination of the locations of the slits 19 in a pair such as pair 121. For example, if a first slit 139 of pair 121 where located at 5.2 inches along the position line 129 and the second slit 141 of pair 121 where located 5.4 inches along the position line 129, the precise position along the segment defined by the combination would be an average 5.3 inches along the position line. Thus, the combination of the slit positions 139 and 141 could define a precise position of 5.3 inches along the position line. As described in more detail below, the present invention does not require that the slits be positioned precisely at 5.2 and 5.4 inches, for example, while defining a very precise position within the segment.

Figure 5:
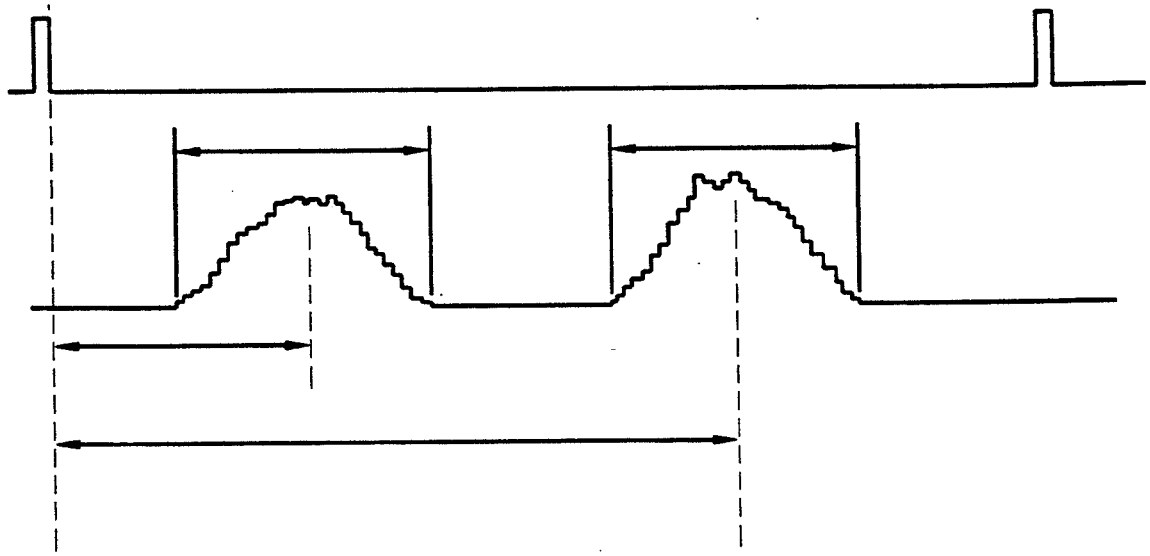
FIG. 5 is a diagram illustrating electrical pulses generated by the device of the present invention.
Figure 6:
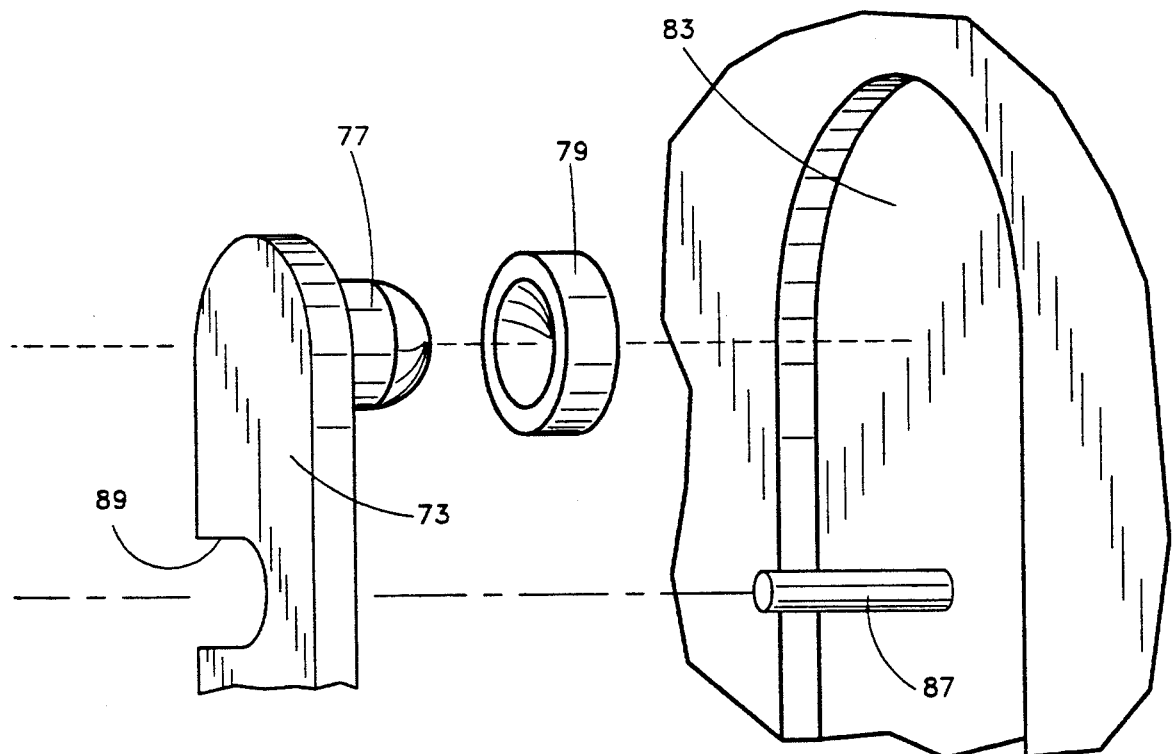
FIG. 6 an enlarged view of a portion of the device shown in FIG. 1.
Figure 7:
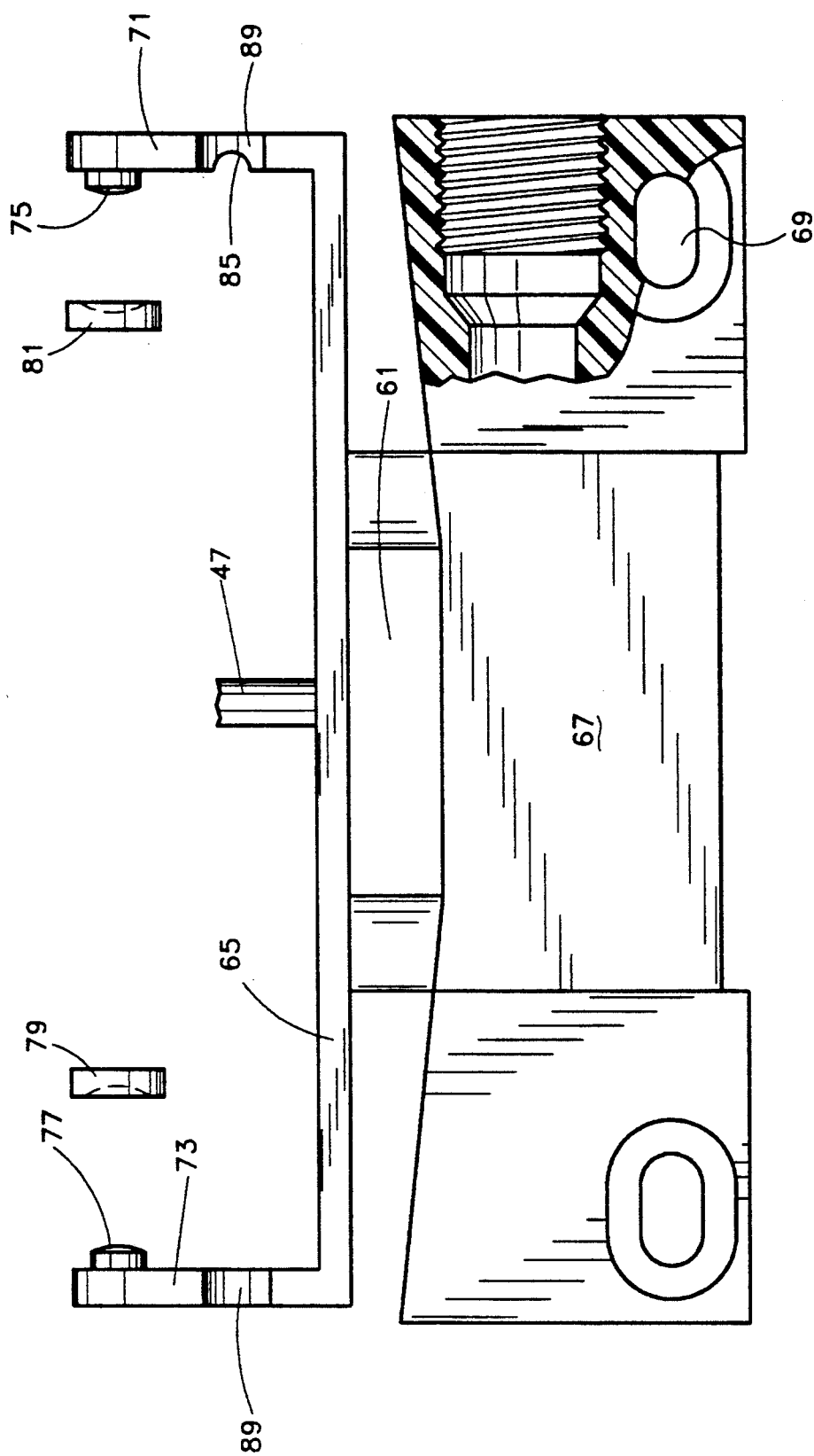
FIG. 7 is a side view of a portion of the device shown in FIG. 1.

FIG. 5 graphically illustrates the voltage output signal of a charge-coupled device 105 detecting the light from the light source 119 through a pair of slits. The x-axis is time and the y-axis is voltage. The time illustrated is sufficient for a single scan of the charge-coupled device photosites or pixels. The voltage indicates the amount of light which hit that pixel at the time when the pixel was sampled as the CCD is scanned.

The light distribution resulting from the lambertian light source 119 shining through the slits 19 is essentially a gaussian distribution for each slit. The present invention utilizes more than the first or last pixel of a slit signal. Rather, the present invention utilizes at least the first and last pixels of a slit signal. The first and last can be determined by a signal greater than a predetermined signal intensity. These first and last signals are then averaged to find the center of the two (a time measurement since the pixels are consecutively sampled by a fast clock). Even better than a first and last pixel representation of the slit signal is a mathematical derivation of the center of the gaussian distribution which utilizes all of the signal intensities greater than a predetermined amount resulting from light passing through the slit and driving the charge-coupled device's photosites. Such a deviation can be mathematically determined by summing all of the signal intensities and utilizing a guassian distribution formula to determine the center of the slit signal.

Thus, the present invention reduces the light signal passing through the slits 139 and 141 to a first time measurement t1 and a second time measurement t2. The t1 quantity is directly proportional to the location of the slit 139 with respect to the charge-coupled device 105 and the quantity t2 is directly proportional to the location of slit 141 with respect to the charge-coupled device 105.

The quantity t2 minus t1 is unique for each segment because the distance between the pairs in each segment is unique. The quantity t1 plus t2 can represent a precise position within the segment such as the mean distance between the slots 139 and 141, for example.

Figure 3:
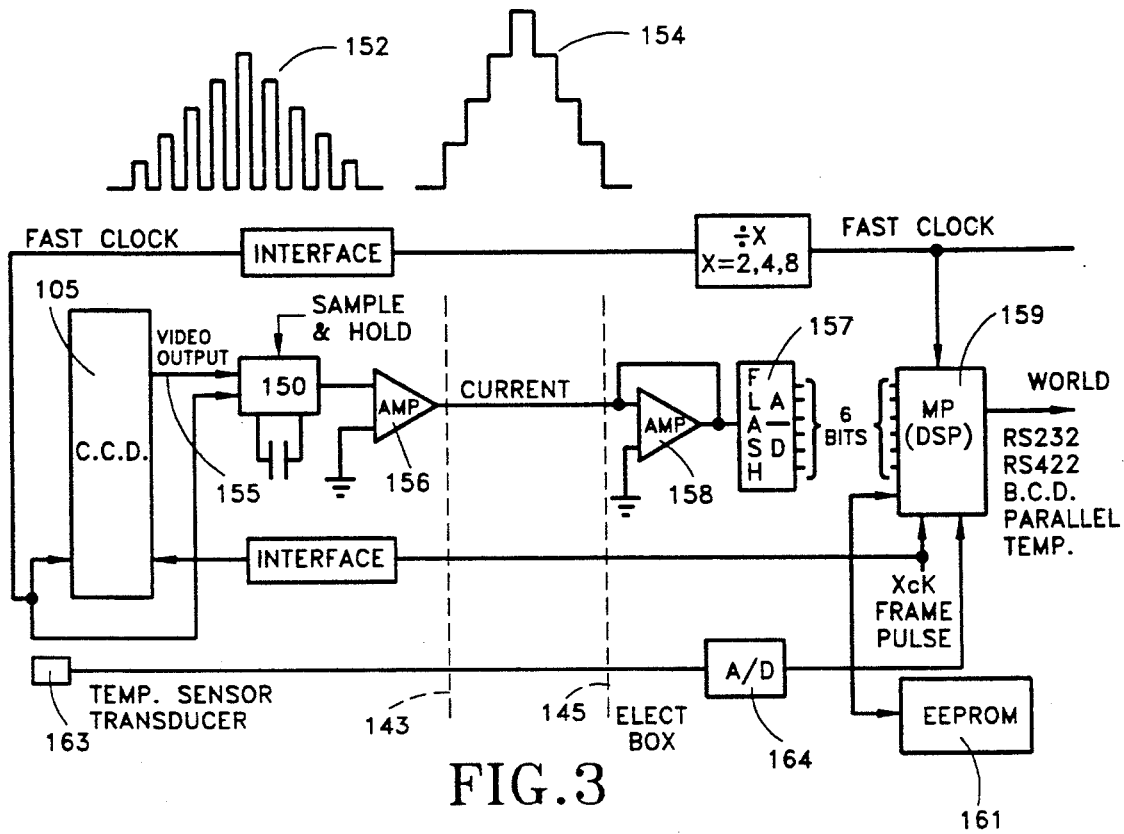
FIG. 3 is a schematic view of an electronic circuit of the device shown in FIG. 1.

To perform the reading operations described above, the present invention utilizes the electronics schematically illustrated in FIG. 3. The electronic components to the left of the dotted line 143 are disposed on a circuit board attached inside rider 59. The components to the right of dotted line 145 can be disposed in a control box (not shown) disposed outside the device; for example, attached to the bed of a lathe. A small, flexible electrical connection 147 connects the circuit board 149 and rider 59 to a signal amplifier board 151 in the traveler head 63. A flexible cable with electrical conduit 153 connects the amplifier board 151 to the control box not shown.

As shown in FIG. 3, the charge-coupled device 105 produces a video output signal 155 which is conveyed to a sample and hold amplifier 150. The signal of a single slit is depicted schematically at 152 prior to sample and hold and at 154 subsequent to sample and hold. The sample and hold signal is further amplified by amplifiers 156 and 158 and then converted to a digital representation by a flash analog to digital converter 157. This digital signal is then processed by a digital signal processor 159. The result is a rapid determination of a quantity t1 (a time quantity) which represents the location of the first slit being scanned with respect to the CCD 105 and a quantity t2 (also a time quantity) which represent the location of the second slit being scanned with respect to CCD 105. These quantities t1 and t2 are not simply single pixel locations but are mathematically derived centers of the slits resulting from the combination of pixel (at least first and last) illuminated through the slits. Thus, the slits are much more accurately located with respect to the CCD using this method of slit reading.

Rather than simply calculating t1 and t2, the microprocessor 159 determines the quantities t1 plus t2 and t2 minus t1. These quantities define the segment (t2−t1) and the precise position in the segment (t1+t2). Of course, since t1+t2 uses even more position information, it is even more accurate as a position indicator than a single slit quantity (t1 or t2).

One of the most important features of the present invention is the utilization of an electronic memory 161 which communicates with the microprocessor 159. Thus, each segment identifier (t2 minus t1) quantity is recorded in the memory 161. As the microprocessor 159 determines a t2 minus t1 from the signal from the charge-coupled device 105 it compares this quantity with the quantities recorded in the memory 161 and thereby determines a segment (such as segment 131) within which the pair of slits read by the charge-coupled device 105 preside. The memory 161 has a corresponding precise mean distance (for example) of the absolute location between the slits of this particular segment residing in memory (a look up table). This quantity is retrieved from the memory 161 and compared with the t1 plus t2 signal resulting from the reading of the slits to provide a precise absolute relative position of the charge-coupled device with respect to the slits being read. Because the position of the charge-coupled device 105 with respect to the slits corresponds to a precise position relationship between the elements to which they are connected, this provides a precise position relationship between the elements to which the device of the present invention is connected. For example, the precise position of the moveable table of a lathe with respect to the lathe bed can be determined.

In order to initially record the t2 minus t1 position information and the t2 plus t1 information in the memory 161, it is desirable that the memory 161 be an electrically erasable programmable read only memory. Initially, a laser interferometer can be connected to the fixed or reference end 27 of the housing 13, and the precise positions of the slits 19 can be read utilizing the laser interferometer as the rider 59 moves down the bar 17. The precise t2 minus t1 and t1 plus t2 quantities can be calculated utilizing the data read from the charge-coupled device 105 combined with the accurate position data provided by the laser interferometer as a calibration run is made.

Thus, a look up table is formed in the memory 161 which has a segment identifier quantity and a position quantity for each segment. For example, a look up table with quantities of inches could be as follows:

| Look Up Table | | |
|---|---|---|
| Segment | t2 − t1 | Calibrated Absolute Position for t1 + t2 |
| 131 | .4 | 0.507135 |
| 133 | .5 | 1.506357 |
| 135 | .6 | 2.491353 |
| 137 | .7 | 3.419370 |

After the quantity t2−t1 is calculated the read only memory returns a calibrated absolute position for t1+t2 corresponding to t2−t1. The actual t1+t2 represents the position of the CCD with respect to the calibrated position (where on the CCD the combined, calibrated position quantity falls). The microprocessor then compares the actual t1+t2 to the calibrated position in order to determine the absolute position of the CCD with respect to the scale. For example, an actual t1+t2 could be 4738.321 (pixels or clock steps) which could be determined by mathematical formula to correspond to 1.017361 inches along the CCD. This is combined with the calibrated position of the t1+t2 for the determined segment (for example, 1.506357 if t2−t1 indicates segment 133) to indicate a precise absolute position of 1.506357+1.017361 or 2.523718 inches.

The method of the present invention includes, therefore, calibrating with a calibration device such as a laser interferometer. This step should be performed with the device 11 attached in a reading position and operating so that the relative positions of the slits 19 are calibrated by combining the quantities read by the device 11 with the position quantities actually determined by the calibration of the reader 21 with respect to each slit 19.

As the calibration of the scale proceeds, the determined positions of the slits or indicia are recorded in the memory 161 so as to create a look up table of calibrated position with respect to the scale for each of the indicia or segments. After the table has been created, position indicia are read by reader 21 and the look up table is used to determine the calibrated position of the machine reader with respect to the scale. As can be seen, the cost of the encoder is dramatically reduced because precision cutting of the slits 19 in the bar 17 is not required. The precision of the device results solely from the precision of the calibration utilizing a device such as a laser interferometer and from the accuracy of the reading method by which the slits 19 are located with respect to the charge-coupled device 105. The memory 161 retains this precision without precise location of the slits in the bar 17. By this means, an accuracy of 0.0001 to 0.000005 can be obtained over a length of several feet.

The output 165 of the microprocessor 159 is an electrical position signal and this signal can be used to automatically electrically control the functions of the device to which the position device 11 is attached. For example, movements of a lathe could be automatically programmed and controlled.

Because this amount of accuracy is sensitive to temperature distortions, the present invention can utilize a temperature sensor 163 mounted on the spring 109. This temperature measurement from the temperature sensor 163 is converted to an electrical signal, converted to a digital signal by analog to digital converter 164, and conveyed to the microprocessor 159 which can, thereby, mathematically adjust for the temperature expansion of the bar 17. The mathematical formula for temperature conversion can be empirically derived using a laser interferometer calibration at representative temperatures.

Although the present invention functions best with devices construed specifically to achieve the objects described above, it is possible to adapt old devices to the method and device of the present invention by adding electronics to calibrate, read and store as taught above. In this way, an old imprecise scale and reader can be made as precise as the calibration interferometer can read. Similarly, if the device of the present invention is damaged or otherwise becomes inaccurate, it can be recalibrated if the memory 161 is an erasable programmable read only memory, or the memory chip can be replaced.

Although the position line 129 of the present invention is shown and described as being linear, it is possible to create a curvilinear position line to adapt the concepts of the present invention to, for example, a rotary device. Although the segments are described as being continuous, it is entirely possible to have discontinuous segments as long as only certain portions of the scale require reading. It is also possible to use the calibration and reading method of the present invention to vastly improve a serial or counter-type position device. Thus, even without pairings to indicate absolute position, the calibration of counted steps allows an imprecise serial device to be made very precise.

Although the present invention is easily adapted to many different sizes, it would typically be from a few inches to several feet long. The device depicted is approximately 4 feet long and approximately 2 inches wide. The slits 19 are typically 0.04 inches wide. If desired, the width of the slits 19 can be used to provide additional information or as a substitute for slit pairs. However, this would reduce the accuracy of the device by reducing the amount of information used to determine the positions.

Thus, the method and device of the present invention are well adapted to achieve the objects and advantages mentioned as well as those inherent therein. It will be appreciated that the instant specification and claims are set forth by way of illustration and not of limitation, and that various changes and modifications made be made without departing from the spirit and scope of the present invention.

What is claimed is:

1. A precision electronic absolute position device comprising:
    a scale disposed along a position line defined by a set of position segments;
    said scale having machine readable indicia fixed thereon in an arrangement and a combination along the position line such that at least two indicia are disposed in each of said segments and the arrangement of said indicia is such that a line position relationship between the at least two indicia in each segment is unique to define the segment, and the combination of the line positions of the at least two indicia defines a precise position along the position line within each segment;
    a machine reading means movable with respect to said scale along the position line such that said reading means extends adjacent said position line a length sufficient for reading the at least two indicia of each segment, for reading and converting to electrical signals the at least two indicia in the at least one segment of said scale such that said electrical signals indicate the line position relationship between the at least two indicia, the combination of the line positions of the at least two indicia and a relative line position of the machine reading means with respect to the indicia;
    electronic memory means for retaining and electronically communicating for each segment a segment indication corresponding to the line position relationship between the at least two indicia of each segment, and an indication of precise position along the position line corresponding to the segment indication and the combination of line positions of the at least two indicia of said segment; and
    position determining means electrically connected to said machine reading means and said memory means for receiving said electronic signals from said reading means, interpreting said signals by electrically communicating with said memory means to determine a segment indication corresponding to said signals and an indication of position along the position line corresponding to said signals, and determining therefrom an absolute position along said position line of said reading means with respect to said scale.

2. The device of claim 1 wherein said determining means comprises:
    calculation means connected to said reading means and said memory means for calculating from information derived from said electrical signals from said reading means and from information derived from said memory means a precise position measurement along the position line corresponding to the segment adjacent the reading means and a relative position measurement of said reading means with respect to said precise position.

3. The device of claim 2 wherein said scale comprises a bar and wherein said indicia comprise slits extending through said bar oriented to extend across said position line to allow light to pass therethrough.

4. The device of claim 3 wherein said machine reading means comprises a charge-coupled device disposed on one side of said bar and extending along and adjacent said position line a sufficient distance to always be in position for reading the at least two slits of at least one segment.

5. The device of claim 4 which further comprises a light source disposed on an opposite side of said bar so as to direct light through said slits to said charge-coupled device.

6. The device of claim 5 wherein said light source is connected to said machine reading means to move with said machine reading means as it moves with respect to the position line of said scale.

7. The device of claim 6 wherein said light source approximates a lambertian light source and extends adjacent said position line of said scale a sufficient distance to always be in position for directing light through said at least two slits positioned for reading by said charge-coupled device.

8. The device of claim 7 wherein said calculation means comprises a means for calculating the center of the light intensity of light which is directed through said slits to said charge-coupled device.

9. The device of claim 8 wherein said light source is positioned less than 0.050 inches from said bar.

10. The device of claim 9 wherein said charge-coupled device is positioned less than 0.050 inches from said bar.

11. The device of claim 10 wherein said charge-coupled device has a resolution of at least 500 pixels per inch, a dynamic range of at least 500 to 1 and a read speed of less than 2 milliseconds.

12. The device of claim 2 wherein said memory means comprises a read only memory device and wherein said calculation means comprises a computer.

13. The device of claim 12 which further comprises a temperature sensor for sensing the temperature of said scale and converting the sensed temperature to an electrical signal indicating said temperature and wherein said calculation means compensates for a thermal expansion of said scale corresponding to said temperature by using said electrical signal indicating said temperature as it determines said absolute position along said position line of said reading means with respect to said scale.

14. The device of claim 12 wherein said read only memory comprises an erasable programmable read only memory device so that said memory indications can be reset to correct for changes in the positions represented by said memory indications.

15. The device of claim 1 wherein said scale has only two machine readable indicia fixed thereon for each of said segments.

16. The device of claim 15 wherein said scale comprises a metal member and said indicia comprise slits extending through said metal member.

17. The device of claim 16 wherein each of said segments is discrete and segments do not overlap.

18. The device of claim 17 wherein said slits each have a width in the range of about 0.005 inches to about 0.1 inches.

19. The device of claim 18 wherein said two slits of each of said segments are spaced apart from each other a unique distance in the range of about 0.05 inches to about 2.0 inches.

20. The device of claim 19 wherein said machine reading means comprises a charge-coupled device extending adjacent said position line a length sufficient for reading said two slits of at least one segment, and having a resolution of at least 500 pixels per inch, a dynamic range of at least 500 to 1, and a read speed of less than 2 milliseconds.

21. The device of claim 20 which further comprises a light source connected to move with said charge-coupled device and disposed to direct light through said slits to said charge-coupled device; said light source approximating a lambertian light source extending along and adjacent said metal member a sufficient length to always direct such light for reading through said two slits of at least one segment.

22. A precision electronic position device comprising:
a scale disposed along a position line defined by a set of position segments;
said scale having machine readable indicia fixed thereon disposed along the position line;
a machine reading means movable with respect to said scale along the position line for reading and converting said indicia to electrical signals;
a memory means comprising a look up table for retaining and a electrically communicating for each indicia an indication of relative position of said indicia along said position line; and
position determining means for receiving said electrical signals from said reading means, interpreting said electrical signals using said memory means, and determining therefrom a relative position along said position line of said reading means with respect to said scale.

23. The device of claim 22 wherein said scale comprises a bar and wherein said indicia comprises slits extending through said bar oriented to extend across said position line to allow light to pass therethrough.

24. The device of claim 23 wherein said machine reading means comprises a charge-coupled device disposed on one side of said bar and extending along and adjacent said position line a sufficient distance to always be in position for reading the at least two slits of at least one segment.

25. A method of determining a position of a machine reader with respect to a scale having position indicia thereon comprising:
calibrating the scale by recording in an electronic memory determined positions of the indicia thereon as indicated by a position calibration machine so as to create a look up table in the electronic memory of calibrated positions with respect to the scale of each of the position indicia;
reading the position indicia of the scale with the machine reader; and
using the look up table of the electronic memory to determine the calibrated position of the machine reader with respect to the scale.

26. The method of claim 25 wherein the position indicia comprise slits in the scale, wherein said reader comprises a charge-coupled device.

27. A method of determining an absolute position of a machine reader with respect to a scale defined by a set of position segments, comprising:
forming position indicia on said scale such that at least two indicia are disposed in an arrangement and a combination in each position segment of said scale and the arrangement of the indicia is such that a position relationship between the at least two indicia in each segment is unique to define each segment and the combination of the positions of the at least two indicia in each segment defines a position within each segment, calibrating the scale by recording in an electronic memory the position relationship between the at least two indicia and a position defined by the combination of the positions of the at least two indicia so as to form a look up table in the electronic memory for each segment of relationship and combination position information, all as indicated by a position calibration machine;

reading the at least two indicia of a segment of the scale with the machine reader; and using the look up table of the electronic memory to determine the segment and combination position of the at least two indicia read so as to determine thereby the absolute position of the machine reader with respect to the scale.

28. The method of claim 27 wherein the position indicia comprise slits in the scale, wherein said reader comprises a charge-coupled device.

* * * * *